United States Patent
Riggs et al.

(10) Patent No.: US 10,029,203 B2
(45) Date of Patent: Jul. 24, 2018

(54) SEPARATION APPARATUS FOR A GAS COMPONENT FROM SPENT DRILLING MUD

(71) Applicant: White's Equipment Rental, LLC, Woodward, OK (US)

(72) Inventors: Billy R. Riggs, Woodward, OK (US); Buckly Binder, Woodward, OK (US)

(73) Assignee: White's Equipment Rental, LLC, Woodward, OK (US)

( * ) Notice: Subject to any disclaimer, the term of this patent is extended or adjusted under 35 U.S.C. 154(b) by 81 days.

(21) Appl. No.: 14/997,018

(22) Filed: Jan. 15, 2016

(65) Prior Publication Data

US 2017/0203248 A1     Jul. 20, 2017

(51) Int. Cl.
| | |
|---|---|
| *B01D 19/00* | (2006.01) |
| *B01D 50/00* | (2006.01) |
| *B01D 46/00* | (2006.01) |
| *B01D 46/10* | (2006.01) |
| *B01D 45/08* | (2006.01) |
| *E21B 21/06* | (2006.01) |

(52) U.S. Cl.
CPC ....... *B01D 50/002* (2013.01); *B01D 19/0042* (2013.01); *B01D 45/08* (2013.01); *B01D 46/0031* (2013.01); *B01D 46/10* (2013.01); *E21B 21/067* (2013.01)

(58) Field of Classification Search
CPC ...... B01D 50/00–50/008; B01D 45/00–45/18; B01D 46/00–46/546; B01D 19/00–19/0495; E21B 21/00–21/18
USPC ........................................... 95/268, 241–266
See application file for complete search history.

(56) References Cited

U.S. PATENT DOCUMENTS

| | | | | |
|---|---|---|---|---|
| 1,899,018 | A * | 2/1933 | Dauphinee | B01D 45/08 55/430 |
| 3,997,303 | A * | 12/1976 | Newton | B01D 46/00 55/320 |
| 5,507,858 | A * | 4/1996 | Jepson | B01D 19/0031 95/262 |
| 6,080,228 | A * | 6/2000 | Okada | B01D 46/0012 55/396 |
| 2007/0175331 | A1* | 8/2007 | Tomshak | B01D 19/0042 96/204 |
| 2008/0290532 | A1* | 11/2008 | Kooijman | B01D 1/305 261/108 |

\* cited by examiner

*Primary Examiner* — T. Bennett McKenzie
(74) *Attorney, Agent, or Firm* — Hall Estill Law Firm

(57) ABSTRACT

A method of using a separation apparatus, the separation apparatus including a fluid chamber and an inlet to the fluid chamber for receiving a gas component of spent drilling mud. The separation apparatus can also include an outlet for directing a purified gas out of the fluid chamber and a splash plate disposed in the fluid chamber adjacent to the inlet to force the gas component of the spent drilling mud downward in the fluid chamber. Furthermore, the separation apparatus includes at least one separation plate having a plurality of holes disposed therein positioned between the splash plate and the outlet to separate the purified gas from the gas component of the spent drilling mud.

16 Claims, 6 Drawing Sheets

SEPARATION APPARATUS FOR A GAS COMPONENT FROM SPENT DRILLING MUD

STATEMENT REGARDING FEDERALLY SPONSORED RESEARCH OR DEVELOPMENT

Not applicable.

CROSS-REFERENCE TO RELATED APPLICATIONS

Not applicable.

BACKGROUND OF THE DISCLOSURE

1. Field of the Invention

The present disclosure relates to a separation apparatus for separating a gas component of spent drilling mud into various components/phases present in the gas component of the spent drilling mud.

2. Description of the Related Art

Wells for recovering oil, gas and the like regularly have to process spent drilling fluids recovered from the well. A gas component can be separated from the spent drilling fluids to be sent to a flare stack to be burned off. Typically, this gas component will include moisture and other components that are harmful to the flare stack.

Accordingly, there is a need for an apparatus that can process the gas component of the spent drilling fluids so that a more pure gas component can be provided to the flare stack.

SUMMARY OF THE DISCLOSURE

The disclosure of this application is directed to a separation apparatus that includes a fluid chamber and an inlet to the fluid chamber for receiving a gas component of spent drilling mud. The separation apparatus can also include an outlet for directing a purified gas out of the fluid chamber and a splash plate disposed in the fluid chamber adjacent to the inlet to force the gas component of the spent drilling mud downward in the fluid chamber. Furthermore, the separation apparatus includes at least one separation plate having a plurality of holes disposed therein positioned between the splash plate and the outlet to separate the purified gas from the gas component of the spent drilling mud. The disclosure is also directed toward a method of using the separation apparatus.

DETAILED DESCRIPTION OF THE DISCLOSURE

Figure 1:
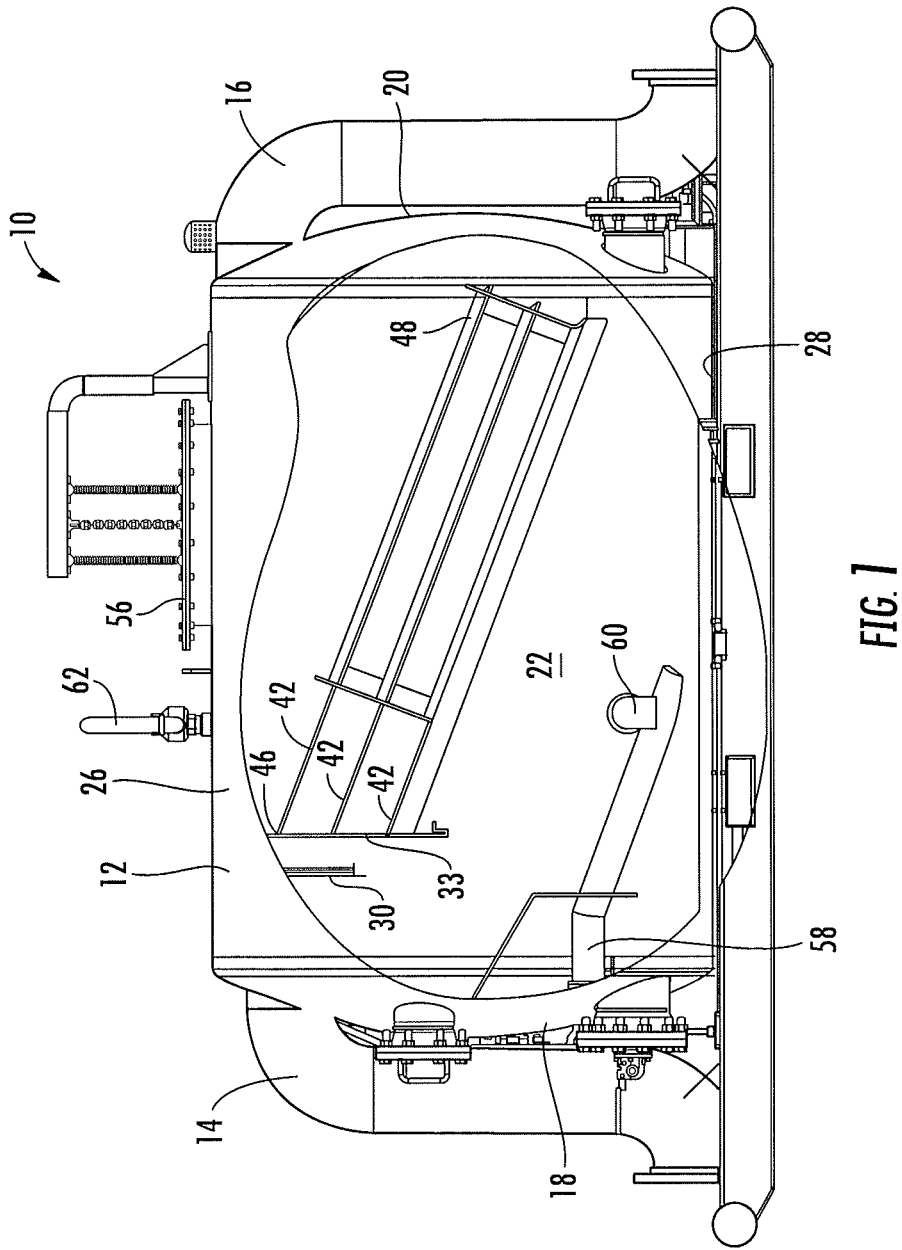
FIG. 1 is a side elevation view with a see-through portion of a separation apparatus constructed in accordance with the present disclosure.
Figure 2:
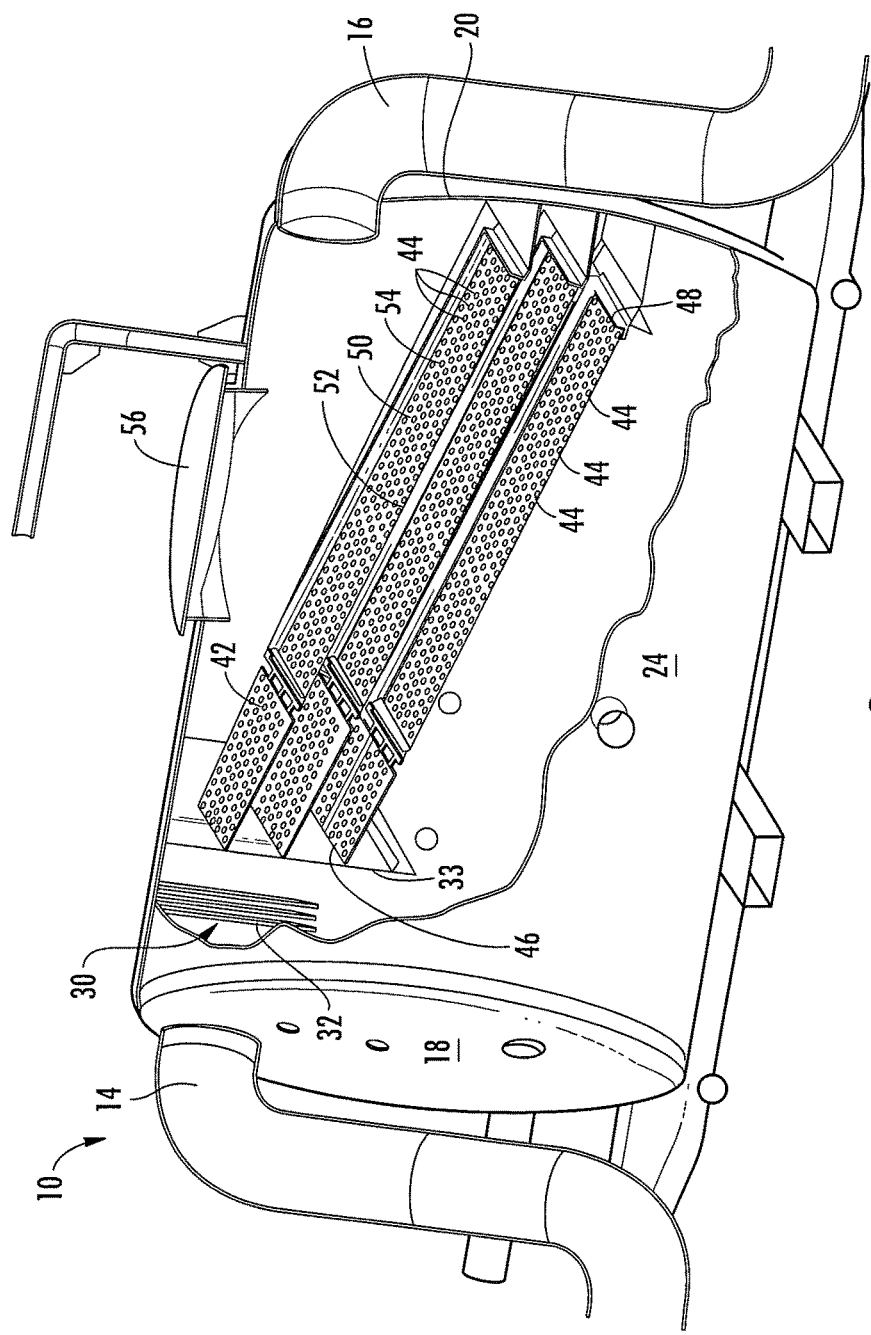
FIG. 2 is a perspective view with a see-through portion of the separation apparatus constructed in accordance with the present disclosure.
Figure 3:
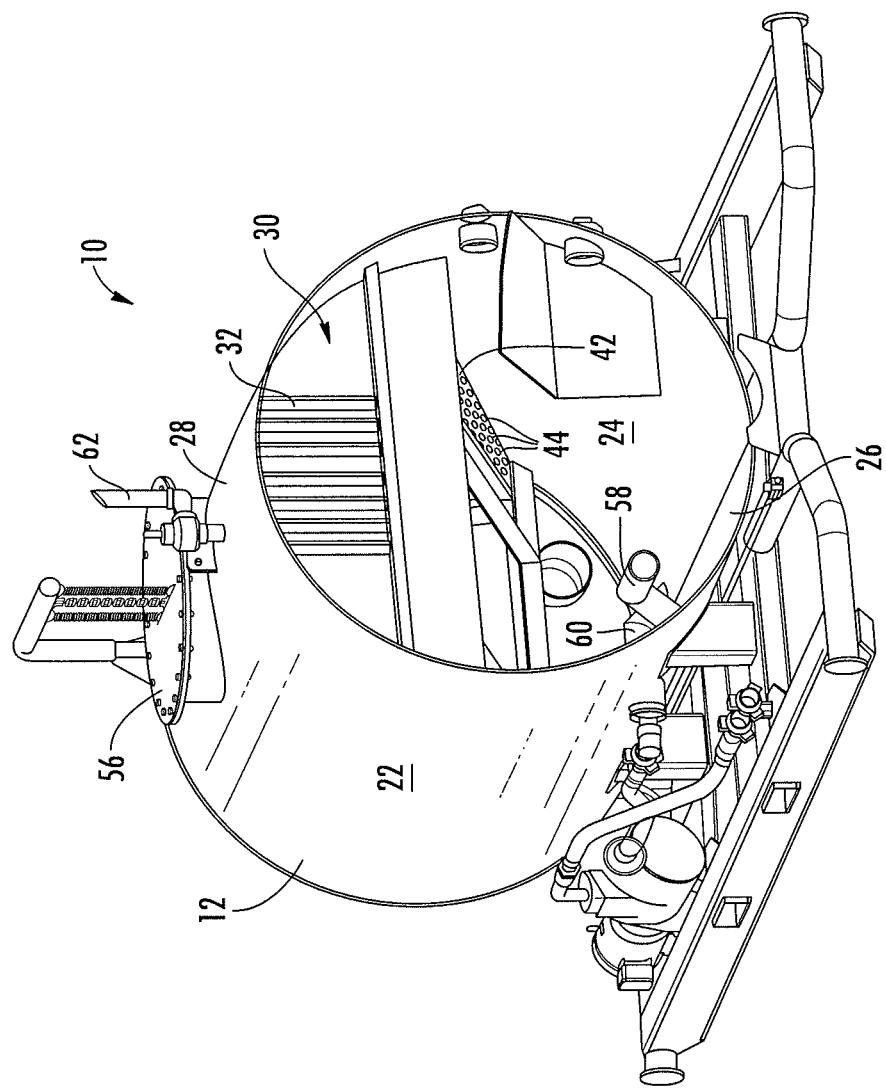
FIG. 3 is another perspective view with a see-through portion of the separation apparatus constructed in accordance with the present disclosure.

Referring to FIGS. 1-4, there is shown a separation apparatus 10 for removing a small fluid component contained in a gas component that is present in spent drilling mud to create a purified gas component. In one embodiment, the separation apparatus 10 can be a catch tank that processes the gas component from the spent drilling mud to remove the small fluid component prior to directing the flow of the purified gas component to a flare stack. The purified gas component can be a combination of air and gaseous hydrocarbons.

The separation apparatus 10 includes a fluid chamber 12 for collecting the gas component of the spent drilling mud, an inlet 14 for delivering the gas component of the spent drilling mud to the fluid chamber 12 and a gas outlet 16 for transporting the purified gas component of the gas component of the spent drilling mud away from the fluid chamber 12. The inlet 14 and the gas outlet 16 can be positioned anywhere on the fluid chamber 12 such that the purified gas component of the gas component of the spent drilling mud can be efficiently separated from the gas component of the spent drilling mud. In one embodiment, the inlet 14 is positioned on an upper portion of a first end 18 of the fluid chamber 12 and the gas outlet 16 is positioned on an upper portion of the second end 20 of the fluid chamber 12. It should be understood that in addition to the first end 18 and the second end 20, the fluid chamber 12 includes a first side 22, a second side 24, a bottom side 26 and a top side 28.

The separation apparatus 10 further includes a diffuser apparatus 30 positioned adjacent to the inlet 14 of the fluid chamber 12 to disperse the gas component of the spent drilling mud entering the fluid chamber 12. The diffuser apparatus 30 can be suspended from the inside of the top side 28 of the fluid chamber 12 or it can be supported from the inside of the bottom side 26 of the fluid chamber 12. The diffuser apparatus 30 can include multiple vertically and/or horizontally disposed rod elements 32 to contact the small fluid component that may be in the gas component of the spent drilling mud and disperse the small fluid component. The rod elements 32 can have any shape desirable such that they are capable of dispersing the small fluid component. The rod elements 32 can be solid or tubular and have any cross-sectional shape known in the art, such as a circle, a square, any polygon having five or more sides, a triangle, a rectangle, and the like. In another embodiment, the rod elements 32 can be lengths of angle iron.

In another embodiment, the gas component of the spent drilling mud that is forced through the diffuser apparatus 30 contacts a splash plate 33 that forces the gas component of the spent drilling mud downward into the fluid chamber 12. A portion of the small fluid component adheres to the splash plate 33, collects there and then drips therefrom down into the fluid chamber 12. Similar to the diffuser apparatus 30, the splash plate 33 can be suspended vertically from the inside of the top side 28 of the fluid chamber 12 or it can be supported from the inside of the bottom side 26 of the fluid chamber 12.

Figure 4:
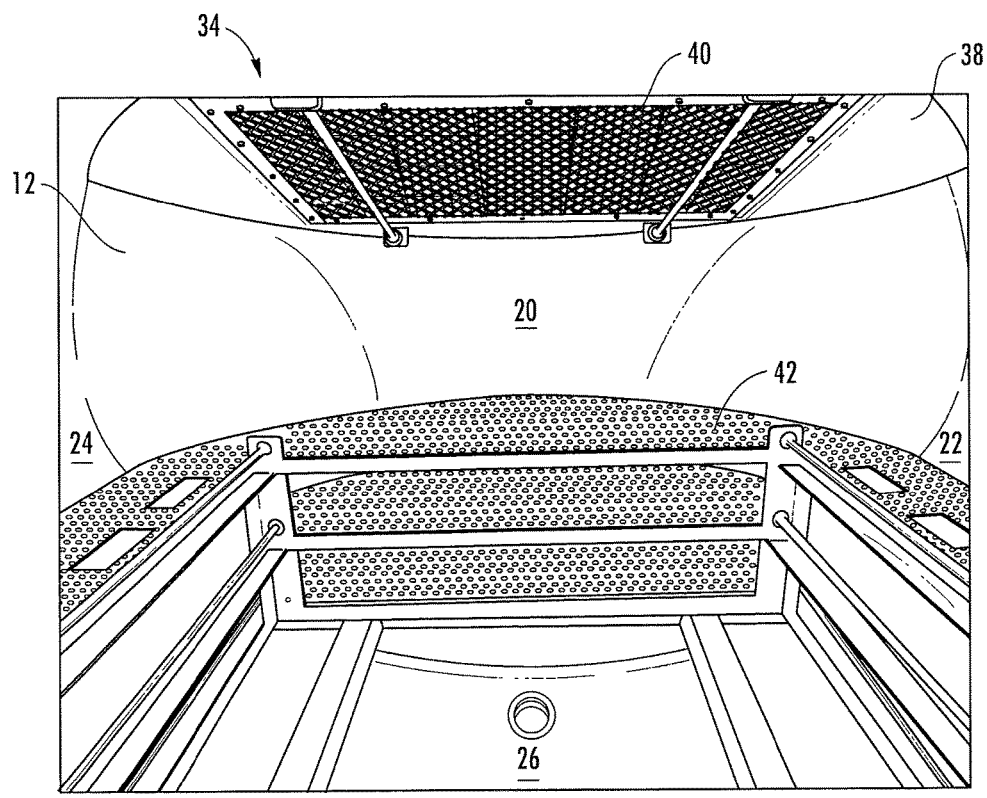
FIG. 4 is a perspective view of an inside portion of the separation apparatus constructed in accordance with the present disclosure.
Figure 5:
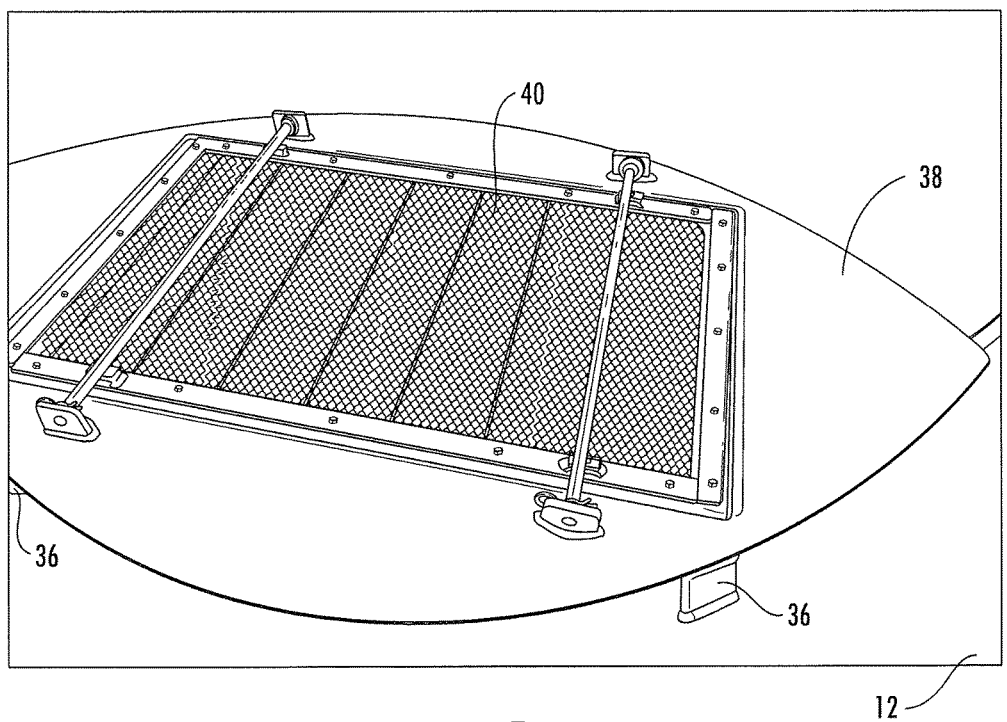
FIG. 5 is another perspective view of another portion of the separation apparatus constructed in accordance with the present disclosure.

Referring now to FIGS. 4-5, the separation apparatus 10 further includes a filtering apparatus 34 disposed adjacent to the gas outlet 16 to prevent everything except the purified gas component of the gas component of the spent drilling mud to enter the gas outlet 16. The filtering apparatus 34 can be suspended from the inside of the top side 28 of the fluid chamber 12 or supported from the inside of the bottom side 26 of the fluid chamber 12. In another embodiment, the filtering apparatus 34 can be supported by the inside of the second end 20 of the fluid chamber 12. In yet another embodiment, the filtering apparatus 34 is supported by the inside of the second end 20 of the fluid chamber 12 by extension elements 36 that position the filtering apparatus 34 a predetermined distance off the inside of the second end 20 of the fluid chamber 12. This predetermined distance allows the purified gas component of the gas component of the spent drilling mud to flow between the filtering apparatus 34 and the inside portion of the second side 20 of the fluid chamber 12. In a further embodiment, the filtering apparatus 34 is sized such that it is larger than the diameter of the gas outlet 16.

In one embodiment, the filtering apparatus 34 includes a plate 38 of material that only allows the gas component to enter the gas outlet 16 by passing between the filtering apparatus 34 and the inside portion of the second side 20 of the fluid chamber 12. In a further embodiment, the filtering apparatus 34 can include a filter portion 40 disposed within the plate 38 and adjacent to the gas outlet 16. The filter portion 40 can be designed in any manner so the purified gas component of the gas component of the spent drilling mud can pass through the filter portion 40 and into the gas outlet 16 while preventing any other components of the gas component of the spent drilling mud from passing therethrough. The filter portion 40 of the filtering apparatus 34 can be made of stainless wire mesh.

The separation apparatus 10 further includes at least one separation plate 42 disposed inside the fluid chamber 12 to breaking foam that may be present in the gas component of the spent drilling mud due to a soap injection into the well during a drilling operation. The separation plates 42 have holes 44 which provide a mechanism for the purified gas component of the foam present in the fluid chamber 12 delivered from the inlet 14 to pass upward therethrough as the bubbles in the foam burst. The purified gas component present in the bubbles in the foam then escapes the fluid chamber 12 via the gas outlet 16.

The separation plates 42 are suspended in the fluid chamber 12 between the splash plate 33 and the second end 20 of the fluid chamber 12. Each separation plate 42 has a first end 46 disposed adjacent to the splash plate 33, a second end 48 disposed adjacent to the second end 20 of the fluid chamber 12, a first side 50 disposed adjacent to the first side 22 of the fluid chamber 12 and a second side 52 disposed adjacent to the second side 24 of the fluid chamber 12. The separation plates 42 can extend from the first side 22 of the fluid chamber 12 to the second side 24 of the fluid chamber 12.

In one embodiment of the present disclosure, the separation plates 42 are angled downward in the fluid chamber 12 as the separation plates 42 extend from the first end 46 of the separation plates 42 toward the second end 48 of the separation plates 42. The downward angle of the separation plates 42 positions the separation plates 42 between the bottom portion of the fluid chamber 12 and the gas outlet 16. This placement of the separation plates 42 forces the gas component of the spent drilling mud that is forced downward in the fluid chamber 12 via the splash plate 33 to have to contact the separation plates 42 before passing out of the fluid chamber 12 via the gas outlet 16. In another embodiment, the fluid chamber 12 can have multiple separation plates 42 and the size of the holes 44 in the separation plates 42 can vary depending upon the design parameters of the desired fluid chamber 12.

Figure 6:
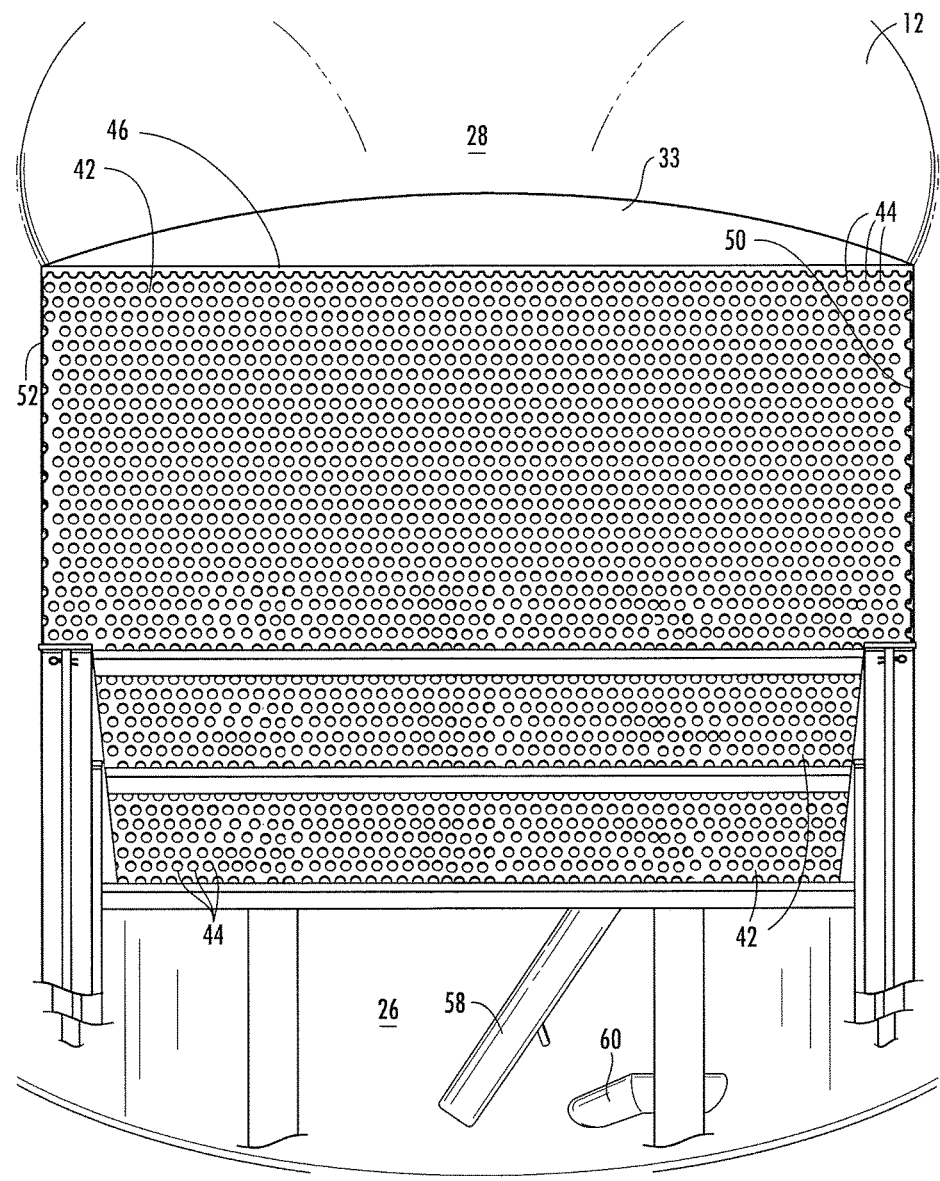
FIG. 6 is another perspective view of yet another portion of the separation apparatus constructed in accordance with the present disclosure.

In yet another embodiment, each separation plate 42 includes a removable plate portion 54 disposed therein. FIGS. 4 and 6 show the plates 42 wherein the removable plate portion 54 has been withdrawn from the fluid chamber 12. The removable plate portion 54 can be removed so that an individual can remove the removable plate portion 54 and gain convenient access to the internal portion of the fluid chamber 12 via an access port 56 disposed in the top side 28 of the fluid chamber 12. The removable plate portions 54 also allow for varying the size of the holes 44 disposed in the separation plates 42 by changing out the removable plate portions 54. The removable plate portion 54 can be supported within the separation plates 42 and held in place by any manner known in the art.

In one embodiment, the gas chamber 12 can also include a secondary outlet 58 to remove any remaining components of the gas component of the spent drilling mud separated from the purified gas component. The secondary outlet 58 can be a clean out line wherein a vacuum truck can be hooked up to suck out any materials that have built up in the bottom of the fluid chamber 12. Additionally, the separation apparatus 10 can include a tertiary outlet 60 for the removal of fluid from the fluid chamber 12. The tertiary outlet 60 can be operated via a float system that automatically opens the tertiary outlet 60 when the fluid in the fluid chamber 12 gets above a predetermined depth. In yet another embodiment, the separation apparatus 10 can include a relief outlet 62 for the removal of fluid from the fluid chamber 12 if the fluid chamber 12 received too much fluid in too short of a time frame.

From the above description, it is clear that the present disclosure is well adapted to carry out the objectives and to attain the advantages mentioned herein as well as those inherent in the disclosure. While presently preferred embodiments have been described herein, it will be understood that numerous changes may be made which will readily suggest themselves to those skilled in the art and which are accomplished within the spirit of the disclosure and claims.

What is claimed is:
1. A separation apparatus, the apparatus comprising:
a fluid chamber;
an inlet to the fluid chamber for receiving a gas component of spent drilling mud;
an outlet for directing a purified gas out of the fluid chamber;
a splash plate disposed in the fluid chamber adjacent to the inlet to force the gas component of the spent drilling mud downward in the fluid chamber;
at least one vertically or horizontally disposed rod elements disposed in the fluid chamber between the inlet and the splash plate to disperse the gas component of the spent drilling mud entering the fluid chamber; and
at least one separation plate extending from the splash plate and having a plurality of holes disposed therein, the entire at least one separation plate positioned between the splash plate and the outlet to separate purified gas from the gas component of the spent drilling mud and the splash plate located entirely between the inlet and the at least one separation plate.

2. The apparatus of claim 1 wherein the splash plate is vertically disposed in the fluid chamber.

3. The apparatus of claim 1 wherein the rod elements have a cross-sectional shape selected from the group consisting of circle, oval, square, rectangle, a polygon with five or more sides, and a combination thereof.

4. The apparatus of claim 1 wherein the rod elements are lengths of angle iron.

5. The apparatus of claim 1 further comprising a filtering apparatus disposed in the fluid chamber adjacent to the outlet for preventing any moisture or debris from exiting the fluid chamber.

6. The apparatus of claim 5 wherein the filtering apparatus comprises a plate portion and a filter portion.

7. The apparatus of claim 1 wherein the separation plate includes a removable plate portion that can be removed to allow access into the fluid chamber by an individual.

8. The apparatus of claim 1 wherein the separation plate is angularly disposed in the fluid chamber and supported on one end by the splash plate.

9. A method, the method comprising:
passing a gas component of spent drilling mud to a separation apparatus, the separation apparatus comprising:
a fluid chamber;
an inlet to the fluid chamber for receiving a gas component of spent drilling mud;
an outlet for directing a purified gas out of the fluid chamber;
a splash plate disposed in the fluid chamber adjacent to the inlet to force the gas component of the spent drilling mud downward in the fluid chamber;
at least one vertically or horizontally disposed rod elements disposed in the fluid chamber between the inlet and the splash plate to disperse the gas component of the spent drilling mud entering the fluid chamber; and
at least one separation plate extending from the splash plate and having a plurality of holes disposed therein, the entire at least one separation plate positioned between the splash plate and the outlet to separate purified gas from the gas component of the spent drilling mud and the splash plate located entirely between the inlet and the at least one separation plate.

10. The method of claim 9 wherein the splash plate is vertically disposed in the fluid chamber.

11. The method of claim 9 wherein the rod elements have a cross-sectional shape selected from the group consisting of circle, oval, square, rectangle, a polygon with five or more sides, and a combination thereof.

12. The method of claim 9 wherein the rod elements are lengths of angle iron.

13. The method of claim 9 further comprising a filtering apparatus disposed in the fluid chamber adjacent to the outlet for preventing any moisture or debris from exiting the fluid chamber.

14. The method of claim 13 wherein the filtering apparatus comprises a plate portion and a filter portion.

15. The method of claim 9 wherein the separation plate includes a removable plate portion that can be removed to allow access into the fluid chamber by an individual.

16. The method of claim 9 wherein the separation plate is angularly disposed in the fluid chamber and supported on one end by the splash plate.

* * * * *